(12) United States Patent
Leickel et al.

(10) Patent No.: US 6,314,287 B1
(45) Date of Patent: *Nov. 6, 2001

(54) HANDSET AND METHOD OF OPERATION THEREOF

(75) Inventors: Torsten Leickel, Herne (DE); Christian Kraft, Copenhagen (DK)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,642

(22) Filed: Feb. 2, 1998

(30) Foreign Application Priority Data

Feb. 5, 1997 (GB) .................................................. 9702290

(51) Int. Cl.⁷ .................................................. H04Q 7/22
(52) U.S. Cl. ........................ 455/426; 455/552; 455/550
(58) Field of Search ............................... 455/553, 552, 455/551, 526, 564, 461, 462, 555, 465; 379/210, 211, 355, 356

(56) References Cited

U.S. PATENT DOCUMENTS

| | | | |
|---|---|---|---|
| 5,153,904 * | 10/1992 | Coombes et al. | 379/355 |
| 5,249,302 * | 9/1993 | Metroka et al. | 455/552 |
| 5,297,191 * | 3/1994 | Gerszberg | 455/419 |
| 5,297,192 * | 3/1994 | Gerszberg | 455/419 |
| 5,305,372 * | 4/1994 | Tomiyori | 379/355 |
| 5,315,638 * | 5/1994 | Mukari | 455/418 |
| 5,345,498 * | 9/1994 | Mauger | 455/406 |
| 5,353,331 * | 10/1994 | Emery et al. | 455/461 |
| 5,367,558 * | 11/1994 | Gillig et al. | 455/426 |
| 5,375,251 * | 12/1994 | Pfundstein | 455/551 |
| 5,379,339 * | 1/1995 | Sakamoto | 455/421 |
| 5,459,774 * | 10/1995 | Breeden | 379/355 |
| 5,535,260 * | 7/1996 | Zicker et al. | 455/564 |
| 5,617,468 * | 4/1997 | Nojima et al. | 455/421 |
| 5,684,873 * | 11/1997 | Tiilikainen | 379/354 |
| 5,692,032 | 11/1997 | Seppanen et al. | 379/59 |
| 5,722,088 * | 2/1998 | Storn et al. | 455/564 |
| 5,875,405 * | 2/1999 | Honda | 455/564 |
| 5,963,875 * | 10/1999 | Go | 455/564 |
| 5,978,678 * | 11/1999 | Houde et al. | 455/433 |

FOREIGN PATENT DOCUMENTS

0738093 * 10/1996 (EP).
2 284 964A 6/1995 (GB).

* cited by examiner

Primary Examiner—Dwayne Bost
Assistant Examiner—Joy K. Contee
(74) Attorney, Agent, or Firm—Perman & Green, LLP

(57) ABSTRACT

A portable radiophone which is adapted to communicate via a cellular network and at least one cordless network, and which comprises a controller unit which controls the communication with said cellular network and said at least one cordless network, and which registers which networks are connected. When a call is to be established, a storage receives a phone number, and the controller unit checks whether the phone number in the storage contains a main number corresponding to the main number of said at least one cordless network. If so, the controller unit determines the extension number of the cordless network for use in the call on the basis of the stored phone number.

15 Claims, 5 Drawing Sheets

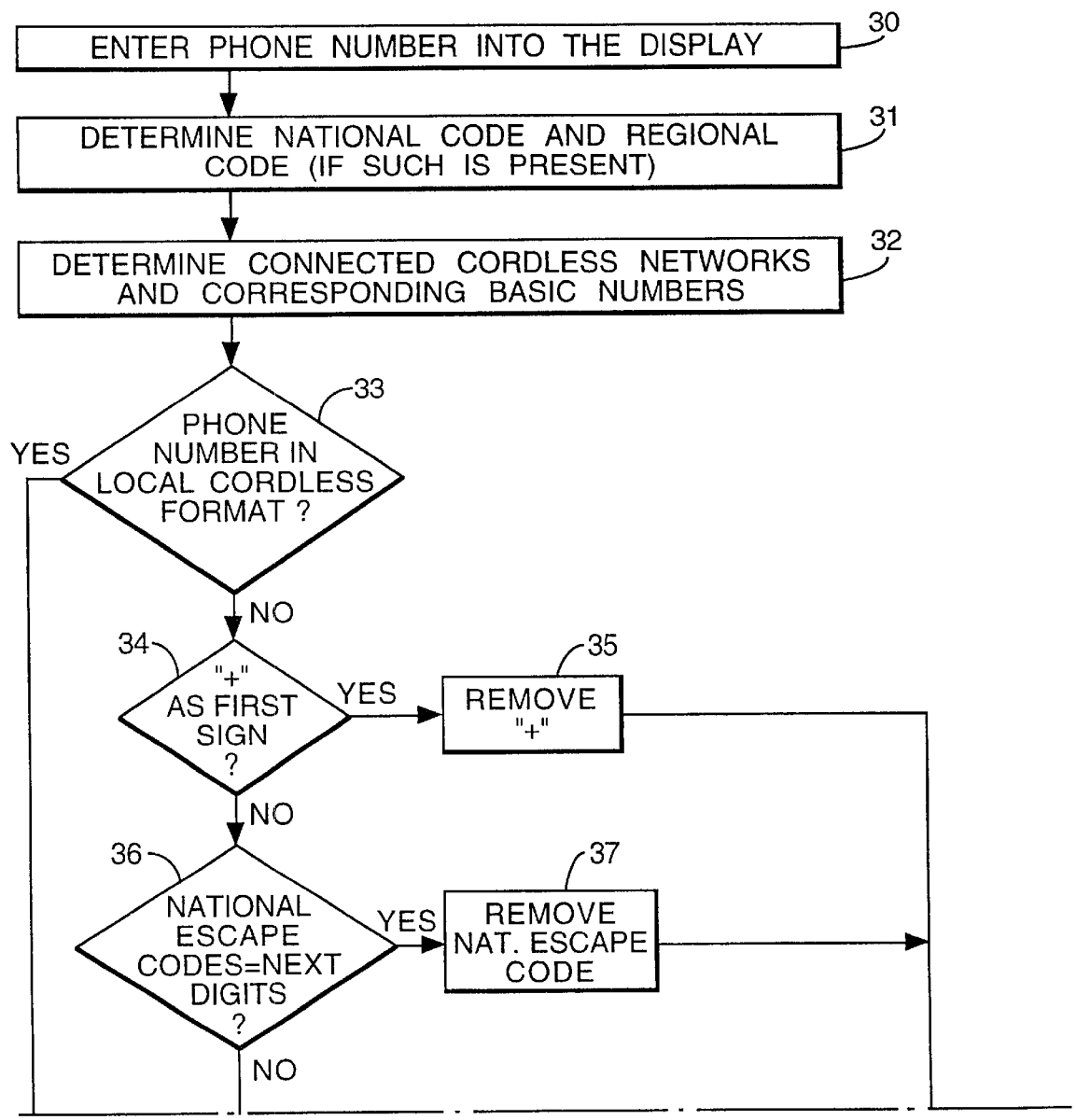

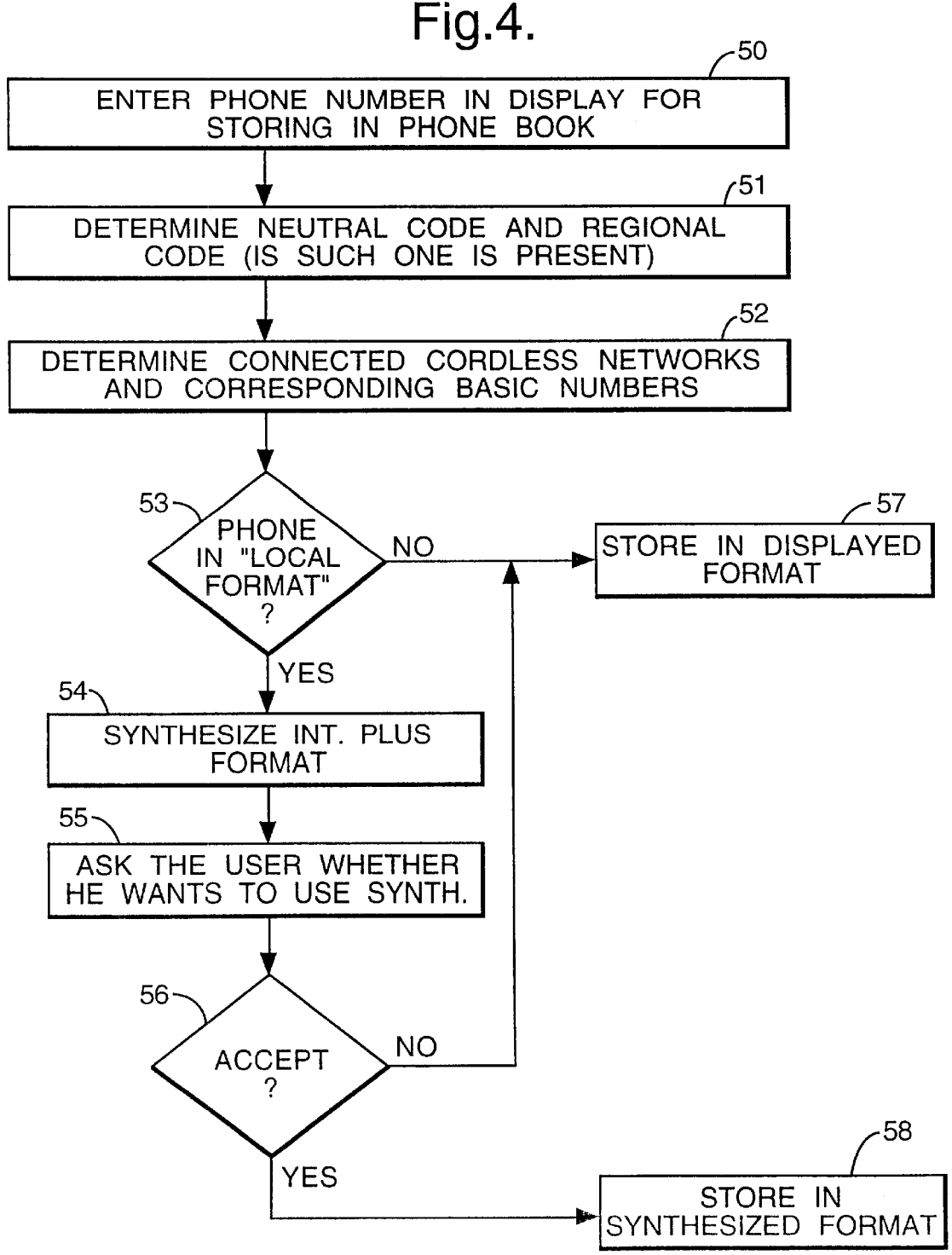

HANDSET AND METHOD OF OPERATION THEREOF

BACKGROUND OF THE INVENTION

The invention relates to a method of automatic handling of phone numbers which are stored in an electronic phone list contained in a portable phone which is connected to a cellular network and one or more cordless networks.

The use of cellular phone systems creates problems, as numbers which may be called by a portable phone, have different formats according to whether the portable phone is present in the same region, in the same country or in another country relative to a phone which is being called. This problem has been solved in the GSM network by allowing it to analyse a called phone number and determine the correct format. This requires that the called phone number is in a so-called international format initiated by a "+" followed by a country code, which is "49" for Germany. This is followed by the number which would have to be called in an international call, which means that regional escape codes are omitted. The GSM network itself is capable of adding the necessary escape codes to the number—both internationally and regionally.

This functions excellently as far as it goes, but it must be expected in future that portable phones may be connected to both cellular networks, such as GSM, and cordless networks, such as DECT, thereby operating as dual mode phones. In DECT systems, the internal numbers will typically be extension numbers to a main number in a PSTN system. The dual mode phone will therefore be capable of calling a phone having an international type phone number via the cellular network, and a short extension number via the cordless network. If the phone number concerned is stored in the electronic phone number register or phone list of the dual mode phone, it must be stored in the long international format as well as in the extension number format, and the user himself must select the correct format when calling. A wrong selection here will have as a consequence that the cordless part of the phone cannot establish a call if it has the PSTN number as its input, or that the cellular part of the phone establishes a cellular call at a cellular rate, even though the in-house cordless rate is considerably cheaper.

SUMMARY OF THE INVENTION

In accordance with a first aspect of the invention there is provided a method of establishing a call using a radiophone which is adapted to communicate via a cellular network and at least one cordless network, comprising registering the networks to which the phone is connected, checking prior to the establishment of a call whether a phone number with which the call is to be established contains a main number corresponding to the main number of said at least one cordless network, determining the extension number of the cordless network if a main number is identified, and using the extension number of the cordless network when establishing the call via the associated cordless network.

The method enables the user to establish a call with a PSTN phone number using a dual mode phone, no matter whether the call is established via a cellular network or a cordless network.

In accordance with a second aspect of the invention there is provided a method of storing a phone number in a radiophone which is adapted to communicate via a cellular network and at least one cordless network, and comprising registering the networks to which the phone is connected as well as their base numbers, and national and regional codes, checking prior to the storage of the phone number whether it is a valid extension number to said at least one cordless network, and, if so, generating a PSTN based number on the basis of the extension number and the registered network information.

In accordance with a third aspect there is provided a portable radiophone which is adapted to communicate via a cellular network and at least one cordless network, and which comprises a controller unit controlling the communication with said cellular network and said at least one cordless network. The controller unit registers the networks which are connected. A call storage memory receives a phone number when a call is to be established, and the controller unit checks whether the phone number of the call storage contains a main number corresponding to the main number of said at least one cordless network. If a main number is identified, the controller unit determines the extension number of the cordless network for use in the call on the basis of the stored phone number.

According to a fourth aspect of the invention there is provided a portable radiophone which is adapted to communicate via a cellular network and at least one cordless network, and which comprises a controller unit which controls the communication with said cellular network and said at least one cordless network and registers the networks which are connected, and a stored phone number list from which a phone number may be obtained when establishing a call. When storing a phone number in the phone number list, the controller unit checks whether the number might be an extension number to said at least one cordless network, and, if so, the controller unit generates a PSTN based number on the basis of the extension number and the registered network information.

BRIEF DESCRIPTION OF THE DRAWINGS

The invention will be explained more fully below in connection with a preferred embodiment and with reference to the drawing, in which:

FIG. 4 schematically shows a flow diagram illustrating how a phone number is analysed prior to storage in a phone number list in a preferred embodiment of the invention.

DETAILED DESCRIPTION OF THE INVENTION

A dual mode handset is a handset capable of being connected to one or more cellular networks, such as GSM, and one or more cordless networks, such as DECT. The advantage of cordless phone systems is that the user obtains the same freedom of movement while being able to use the PSTN network at the rates of that network. When a cordless system and a cellular system are integrated, the use may use the same phone without having to think about which system has coverage. The DECT-GSM interworking profile is in the process of being standardized as ETSI standard ETS 300-370.

Figure 1:
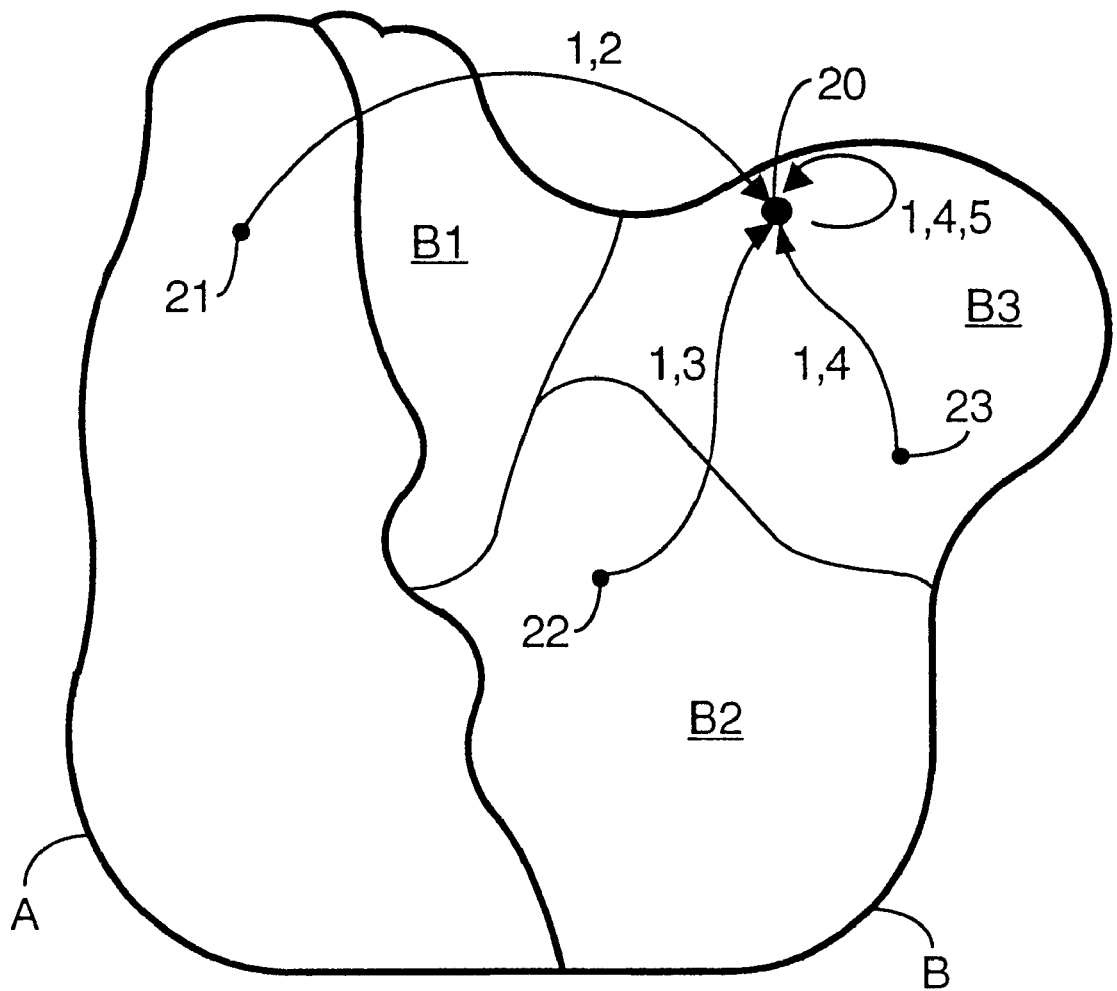
FIG. 1 schematically shows a scenario of the options available to a hand portable dual mode phone according to the invention when establishing a call to a phone connected to a cordless network.

FIG. 1 shows a scenario illustrating how the same phone may be called with various formats according to where the calling phone is located relative to the called phone. The various formats of the phone number are shown in table 1, which shows that called phone number is a German number because of the country code "49", and that it is moreover located around Munich, as it has a regional code "89". The actual number "12 34 567" is composed in an arbitrary manner, it being assumed to be a direct dialling number to "Employee#567" in "Company20" in the present case. "Company20" has a base number "1234" so that its main number may be called by the number 1234-0, while the individual employees may be called by providing the base number with the extension number of the employee concerned, as "Employee#567" will have the extension number "567".

If the phone system of "Company20" is a cordless system, e.g. a DECT system, a person may establish a call to "Employee#567" with a dual mode phone connected to the DECT system by means of the numbers listed in table 1 according to where person is present.

TABLE 1

| Scenario | Phone number | Explanation |
| --- | --- | --- |
| 1 | +49 89 12 34 567 | International plus-format |
| 2 | 00 49 89 12 34 567 | International format with national escape codes |
| 3 | 0 89 12 34 567 | National number |
| 4 | 12 34 567 | Regional number |
| 5 | 567 | Extension code or local number |

Two countries A and B are shown in FIG. 1, where B corresponds to Germany. Country B is moreover divided into regions B1, B2 and B3, the location of "Company20 " being indicated by the point 20 in B3 (the Munich area).

When the person calls "Employee#567" from country A, indicated by the point 21, with the dual mode phone, this is usually done via the cellular part of the phone, since the DECT part has no coverage unless it is present in a host network. In the call, the user may use partly "International plus-format" (+49 89 12 34 567) and partly "International format with national escape codes" (00 49 89 12 34 567), it being noted that escape codes are usually "00", but may have other digits in some countries. This option is indicated by the scenario mark on the arrow connecting the points 21 and 20.

If instead, the user called "Employee#567" with the dual mode phone in a national call, but from another region, B2, indicated by the point 22, this will usually also take place via the cellular part of the phone. In the call, the user may use the "National number" (0 89 12 34 567), it being noted here that the region B2 is left with the escape code "0", and that the region B3 is reached with the code "89" of the region.

It should be noted that when making a call with his GSM phone, the user may use the "International plus-format" (+49 89 12 34 567), as the GSM network is capable of decoding precisely this format, so that it may be used for establishing both national and international calls, without the escape codes having to be known. This option is indicated by the scenario mark on the arrow connecting the points 22 and 20.

If, instead, the user called "Employee#567" with the dual mode phone in a regional call from the same region, B3, indicated by the point 23, this will take place via the cellular part of the phone when it has no DECT coverage. In the call, the user may use the "Regional number" (12 34 567) via the GSM system. It should be noted that "International plus-format" (+49 89 12 34 567) may also be used here in the GSM system. This option is indicated by the scenario mark on the arrow connecting the points 23 and 20.

If the user instead called "Employee#567" with the dual mode phone in an in-house call covered by the DECT system of "Employee#567", marked by the point 20, this will take place both via the cellular part of the phone and via the DECT system. In the call, the user may use the "Regional number" (12 34 567), the "International plus-format" (+49 89 12 567), using the cellular network, and the "Extension code" (567) using the DECT network. It should be noted here that it does not matter whether "Employee#567" has DECT phone or an ordinary cord phone, provided his phone can be reached via the in-house network. The option is indicated by the scenario mark on the arrow connecting the point 20 with itself.

Figure 2:
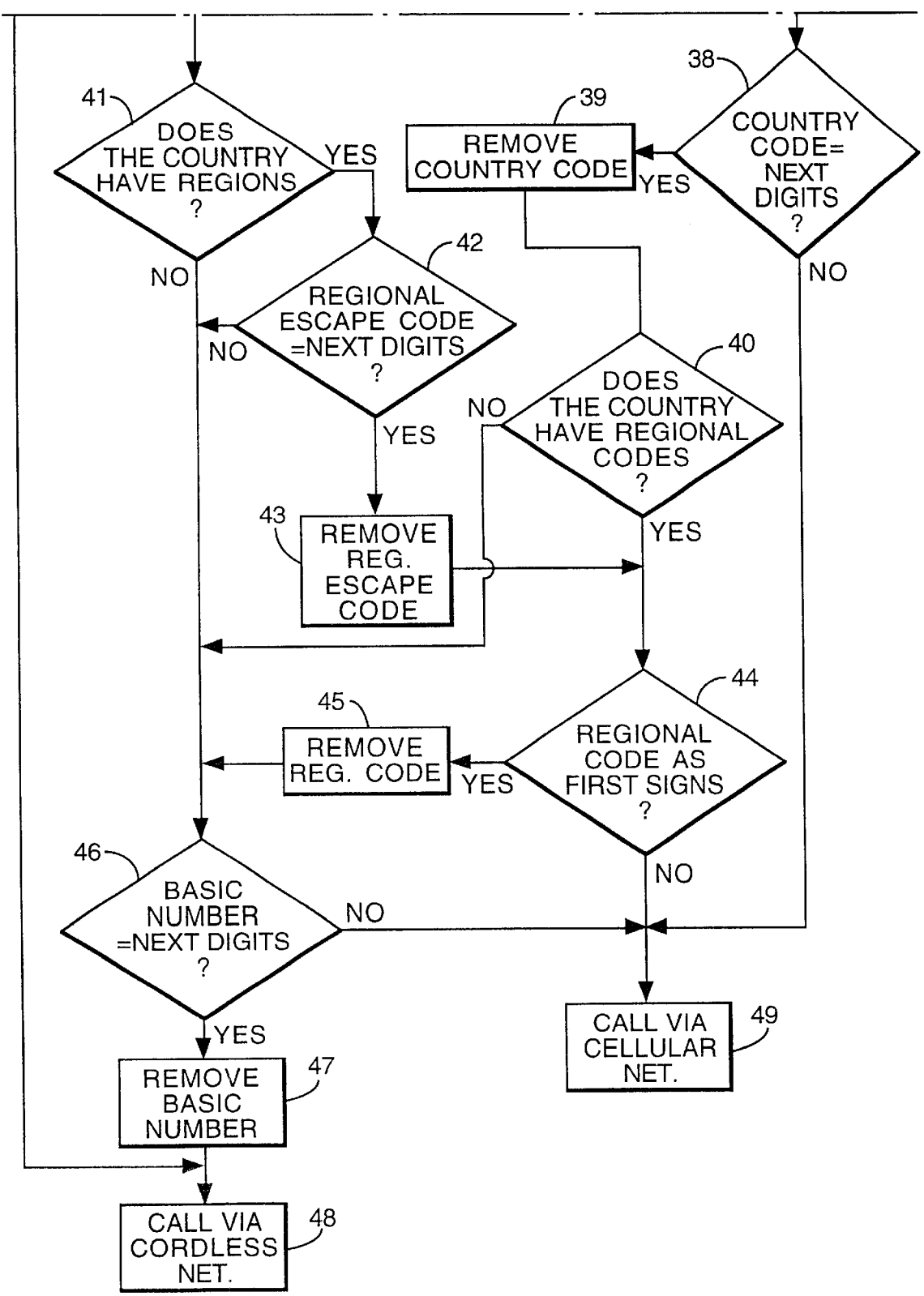
FIG. 2 schematically shows a flow diagram illustrating how a phone number is analysed prior to the establishment of a call in a preferred embodiment of the invention.

A preferred embodiment of the analysis procedure in the phone will be described below with reference to FIG. 2.

When the user of the phone has entered a phone number in the display of the phone—either manually or obtained from the electronic phone list of the phone (stage 30 in FIG. 2)—and requests establishment of a call, the controller of the phone begins to analyse the status of the phone and the phone number.

The phone will currently be updated about its actual position via e.g. the GSM system, and the controller of the phone can determine both country code and regional code corresponding to the actual position of the phone by means of a look-up table. This takes place in stage 31. However, it should be noted that not all countries are divided into regions, and that the PSTN regions are not necessarily the same as the GSM regions, for which reason the detection in some cases requires access to a look-up table so that the identification code of the cell may be used in the determination of the PSTN region.

It is then checked in stage 32 with which networks the phone is connected. Even though a DECT is to be assigned to a DECT network before it can communicate via this, it is quite conceivable that the phone is assigned to several so-called office networks in the form of geographically scattered DECT networks in various companies within the same group of companies, e.g. "Company 20"–"Company 24". Furthermore, the phone may be assigned for home use "Home", and it may then be used in a private DECT system. In this connection, it will frequently form part of a group of phones of collective ringing—and therefore typically does not have an extension number.

Typically, the phone will only have coverage by a single cordless network and a cellular network, or by a cellular network alone. If the phone has coverage by the "Company 20" cordless network, the base number (1234) of this network is known from the assignment procedure. A copy of the phone number in the display is transferred to a new storage location where the analysis takes place.

It is checked in stage 33 whether the phone number is a format corresponding to the cordless system or systems with which coverage has been obtained. The phone knows this format from its assignment to the cordless system, and where the phone number is in accordance with the format, it is attempted to establish a call via the cordless part of the phone, cf. stage 48.

If the phone number does not correspond to the local cordless format, it is checked in stage 34 whether the phone number is of international plus-format, which means that it begins with "+". If so, the "+" is removed in stage 35, and it is checked in stage 38 whether it is a national call, which will be the case if the phone number in the analysis storage location begins with country code determined in stage 31. If there is no consistency, it is an international call, and the call is then established with the phone number in the display via the cellular part of the phone, cf. stage 49.

If it was determined in stage 34 that the phone number was not of international plus-format, it is checked in stage 36 whether it is a number in international format with national escape codes. Here, the phone contains a look-up table of national escape codes, which are "00" for most countries, but e.g. "19" is for France. If the escape code is identified in stage 36, it is removed in stage 37, and it is checked in stage 38 whether it is a national call.

If it is identified in stage 38 that the phone number is a national number, the country code is removed from the phone number in the analysis storage location, which takes place in stage 39. The phone number in the analysis storage location will then be in a national format. As it has previously been identified as an international number, it will perhaps be without regional escape codes. The controller unit of the phone checks in stage 40 whether the country concerned has regional codes. If so, the next digits are compared with the codes for the region in which the phone is present, which takes place in stage 44, and in case of divergence the call is assumed to be a national call between two regions, for which reason the call is established via the cellular network in stage 49.

Correspondingly, a negative identification of national escape codes in stage 36 will mean that the phone number is considered to be a national number. Then, the controller unit of the phone checks whether the country concerned has regions requiring escape codes in the establishment of an interregional call, which takes place in stage 41. If such escape codes exist in the country, it is attempted to identify the code in stage 42, and it is removed in stage 43, following which it is checked in stage 44 whether it is an interregional call, and if so, it is to be established via the cellular network in stage 49.

If the controller unit of the phone found in stage 41 that the country concerned was not divided into regions, it is concluded that the phone number does not contain any regional code, but is a regional number. Some countries are not divided into regions, and all national calls are therefore handled as regional calls. Correspondingly, the phone will conclude that the phone number is a regional number if no regional escape code could be identified in stage 42.

Correspondingly, the phone will conclude that the phone number is a regional number if it was concluded in stage 40 that the country concerned has no regional codes, or if stage 44 identified regional codes corresponding to the region concerned, said codes being then removed in stage 45.

When the phone has recognized the phone number as being regional, it is checked in stage 46 whether the base number of the cordless network or networks with which the phone is connected, can be identified in the phone number in the analysis storage location, and if a base number is identified, it is removed in stage 47 from the phone number in the analysis storage location, which will then just contain the extension number of a phone in the cordless network concerned. Then, a call may be established via the cordless part in the phone, which is done in stage 49 on the basis of the phone number in the analysis storage location. If the base number could not be found in stage 46, a call may instead be established via the cellular part of the phone on the basis of the phone number in the display.

Figure 3:
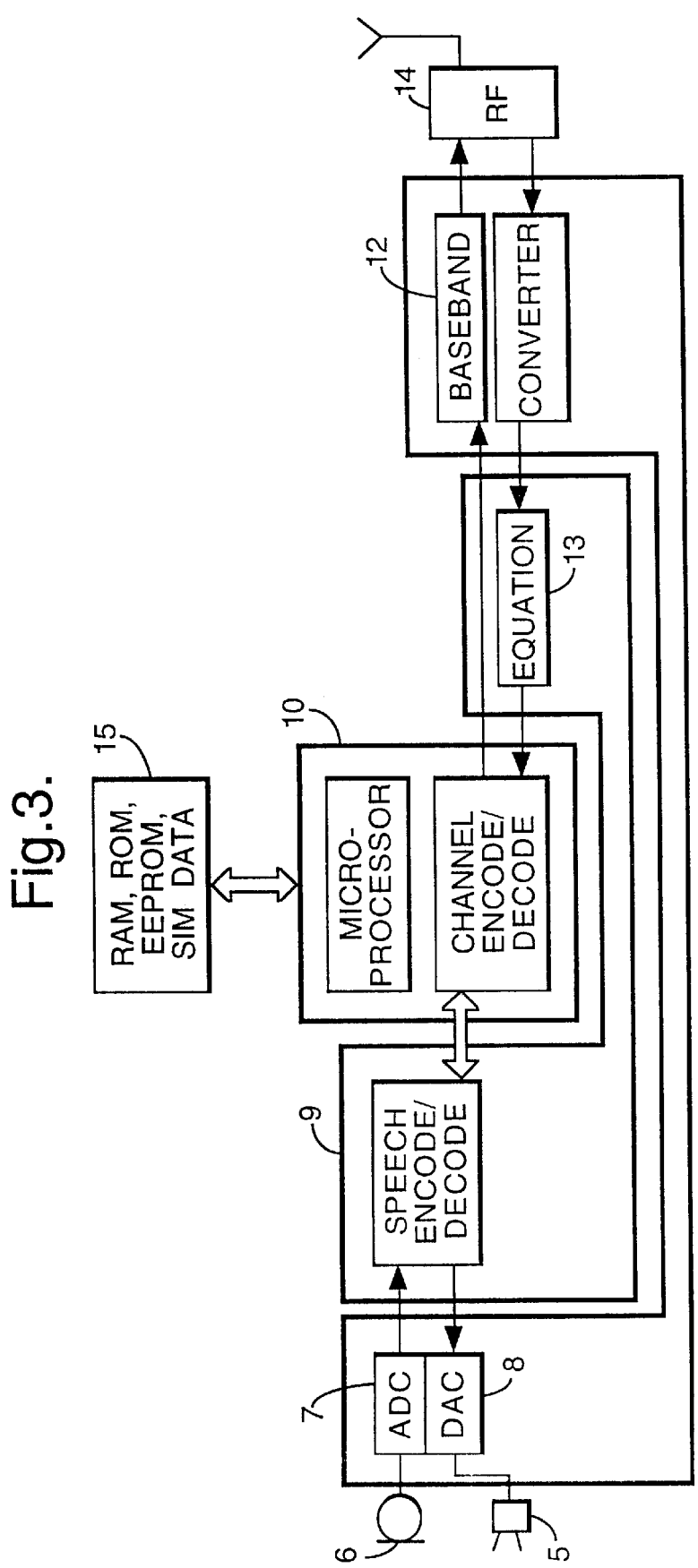
FIG. 3 schematically shows the hardware parts of a hand-portable phone which are essential to the understanding of the invention.

FIG. 3 schematically shows the most important parts of a preferred embodiment of a hand-portable phone, said parts being essential to the understanding of the invention. The preferred embodiment of the phone of the invention is a dual mode phone preferably for use in Europe and is therefore adapted for use in connection with partly the GSM network, partly one or more DECT cordless networks, but, of course, the invention may also be applied in connection with other phone networks based on cellular networks, such as PCN/DCS 1800, NAMPS and JDC, as well as various forms of cordless phone systems, such as PHS (mainly Japan) and PWT (USA).

The microphone 6 registers the user'speech, and the resulting analog signals are A/D converted in an AID converter 7 before being speech-encoded in an audio encoding/decoding unit 9. The encoded speech signal is transferred to a physical layer processor 10, which supports i.e. the GSM terminal software.

The processor 10 also constitutes the interface to the peripheral units 15 of the apparatus, e.g. in the form of SIM, data, power supply, RAM, ROM, display and keypad. The processor 10 communicates with the RF part 14 via a baseband converter 12 and a channel equalizer 13. The RF part 14 may advantageously be common to both the cellular system and the cordless system, but may have different LO frequencies. The audio encoding/decoding unit 9 speech-decodes the signal, which is transferred from the processor 10 to the earpiece 5 via a D/A converter 8. The units 7–13 will usually be integrated in a chip set.

A cordless phone number (local in-house or extension number) could also be converted to international plus-format in connection with the storage of the cordless number in the phone list of the dual mode phone.

When, in stage 50, the user of a dual mode phone enters a new phone number with a view to storing it in the electronic phone list of the phone, the controller of the phone may advantageously check whether the phone number concerned is a local number or an extension number to a DECT system to which the phone is connected. The checks in stages 51 and 52 correspond to the checks in stages 31 and 32 in connection with FIG. 2.

The controller then checks in stage 53 whether the number has a valid format (number of digits and number interval), and, if so, it synthesizes a number in international plus-format in stage 54 and asks in the display whether the user in stage 55 should instead be interested in saving the number in international format (first or second row in table 1), as this number may be used both cordlessly and cellularly with the phone according to the invention.

If, as an example, the user was about to save the number "512" under the name of "Brandt", while he had coverage by the "Company 20" DECT system, the phone, in its preferred embodiment, would propose the following display:

TABLE 2

| Brandt | Company20 |
|---|---|
| +49 89 1234 512 | | as the name of "Brandt" was the name of the person whose number is to be saved, "Company 20" is partly the name of the DECT system which covers the phone, partly the basis for the phone guess of Brandt's phone number in international plus-format. "+" is self-evident, as, in the preferred embodiment, the phone uses international plus-format as default. "49 89" is known by the phone from the GSM part, while "1234" is the base number of "Company 20". If the user accepts the proposal in stage 56, it is saved under the name of "Brand" in a location in the phone list (stage 58). If, in stage 53, the phone number was analysed to be a non-valid extension number, or if the user did not accept the proposal in stage 56, the original phone number is saved instead in the display in stage 57.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. A method of establishing a call to a phone using a radiophone which is adapted to communicate via a cellular network and at least one cordless network, said radiophone including a controller and a memory, said method comprising steps of:

registering in said memory the networks to which the phone is connected, said networks including a cellular network and a cordless network;

storing telephone numbers in said memory;

by means of said controller, automatically checking with numbers stored in said memory prior to the establishment of a call whether a phone number with which the call is to be established contains a main number corresponding to the main number of said at least one cordless network;

determining whether communication is to be via the cellular network or the cordless network based on present location of the radio telephone;

extracting a sequence of digits from the stored numbers of said memory for initiating communication via one of said cellular and said cordless networks; and in the case of communication via the cordless network, said extracting step comprises determining the extension number of the cordless network if a main number is identified; and using the extension number of the cordless network when establishing the call via the associated cordless network.

2. A method according to claim 1, wherein the phone number is divided into segments in the analysis, such as national code, regional code and short phone number format.

3. A method according to claim 2, wherein the main numbers of the cordless network are searched at the beginning at the short phone number format segment in the analysis.

4. A method according to claim 1, wherein a storage is provided for the storage of phone numbers and associated name identification, and wherein the phone number storage contains phone numbers stored in international plus-format.

5. A method of storing the number of a phone in a memory of a telephone handset which is adapted to communicate via a cellular network and at least one cordless network, said handset including a controller, said method comprising steps of:

registering in said memory the networks to which the phone is connected as well as their base numbers and national and regional codes;

by means of said controller, checking prior to the saving of the phone number whether it is a valid extension number to said at least one cordless network and, if so, generating by said controller a PSTN based number on the basis of the extension number and the registered network information;

determining whether communication is to be via the cellular network or the cordless network based on present location of the telephone handset;

extracting a sequence of digits from the stored numbers of said memory for initiating communication via one of said cellular and said cordless networks.

6. A method according to claim 5, wherein the generated phone number is stored in international plus-format.

7. A telephone handset which is adapted to communicate via a cellular network and at least one cordless network, comprising:

a controller unit which controls the communication with said cellular network and said at least one cordless network, and which registers which networks are connected;

a call storage receiving a phone number in the establishment of a call;

wherein the controller unit, when establishing a call, automatically checks whether the phone number in the call storage contains a main number corresponding to the main number of said at least one cordless network;

wherein the controller unit, if a main number is identified, determines the extension number of the cordless network for use in the call on the basis of the stored phone number; and wherein the controller unit is operative further to determine whether communication is to be via the cellular network or the cordless network based on present location of the telephone handset, and to extract a number from the call storage for initiating communication via one of said cellular and said cordless networks.

8. A telephone handset according to claim 7, wherein the controller unit divides the phone number into segments, such as nation code, region code and short phone number format in the analysis of the phone number in the call storage.

9. A telephone handset according to claim 8, wherein the controller unit searches for the main numbers of the cordless network at the beginning of the short phone number format segment.

10. A telephone handset according to claim 7, wherein the controller unit has an associated storage for the storage of phone numbers and associated name identification, and wherein the controller unit, when singling out a name identification, transfers the associated phone number to the call storage.

11. A telephone handset according to claim 10, wherein the associated phone number storage contains phone numbers stored in international plus-format.

12. A portable radiophone which is adapted to communicate via a cellular network and at least one cordless network, comprising:

a controller unit which controls the communication with said cellular network and said at least one cordless network, and which registers which networks are connected;

a memory having a stored phone number list from which a phone number may be obtained when establishing a call;

wherein the controller unit, when storing a phone number in the phone number list, automatically checks whether the number might be an extension number to said at least one cordless network;

wherein the controller unit, if this should be the case, generates a PSTN based number on the basis of the extension number and the registered network information; and wherein the controller unit is operative further to determine whether communication is to be via the cellular network or the cordless network based on present location of the radiotelephone, and to extract a number from the memory for initiating communication via one of said cellular and said cordless networks.

13. A handset according to claim 12, wherein the generated phone number is stored in international plus-format.

14. A handset capable of establishing a communication link via respective radio networks using a code indicative of a handset to be reached, said networks including a cellular network and a cordless network, handsets accessible via at least one of the respective networks having a code comprising a first string indicative of a network and a second string indicative of a particular handset in communication with that network, the handset having a preference for establishing a connection via one of the respective networks, the handset comprising:

processing means capable of identifying locally available ones of the respective networks;

means for automatically identifying the first string and the second string from a code indicative of a handset to be reached; and means for establishing a call via the preferred network using only the second string if the first string is indicative of the preferred network; and wherein the call-establishing means is operative further to determine whether communication is to be via the cellular network or the cordless network based on present location of the handset.

15. A method of establishing a call using a radiophone which is adapted to communicate via a cellular network and at least one cordless network, said radiophone including a controller and a memory, said method comprising steps of:

registering in said memory networks to which the phone is connected, said networks including a cellular network and a cordless network;

storing telephone numbers in said memory for phones to be called, the telephone numbers stored in said memory for the phones to be called enabling the radiotelephone to initiate communication with a called phone via a plurality of numbers wherein one of said plurality of numbers establishes communication via the cellular network and a second of said plurality of numbers establishes communication via the cordless network;

determining whether communication is to be via the cellular network or the cordless network based on present location of the radio telephone;

extracting a sequence of digits from the stored numbers of said memory for initiating communication via one of said cellular and said cordless networks; and in the case of communication via the cordless network, said extracting step comprises, by means of said controller, automatically checking with numbers stored in said memory prior to the establishment of a call whether a phone number with which the call is to be established contains a main number corresponding to the main number of said at least one cordless network.

* * * * *